United States Patent Office 2,804,894
Patented Sept. 3, 1957

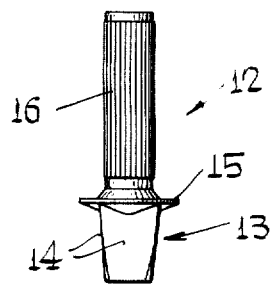
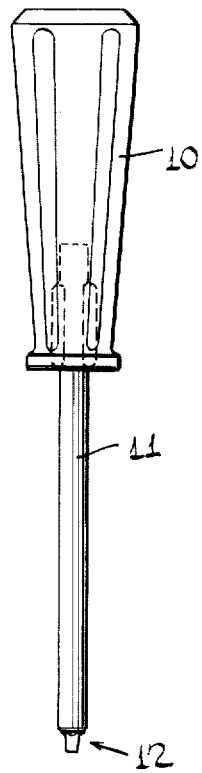
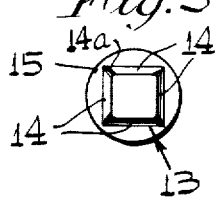
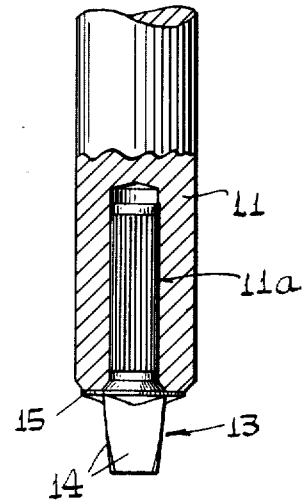
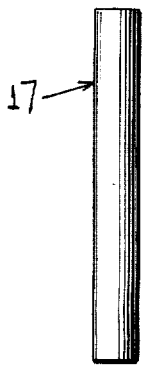
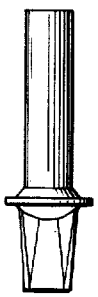
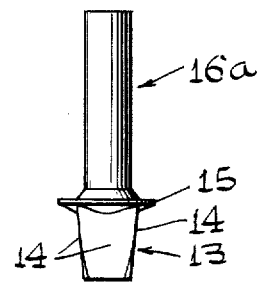

2,804,894
SCREW DRIVER

William F. Rosenburg, Bridgeport, Conn., assignor to The Cornwall & Patterson Company, Bridgeport, Conn., a corporation of Connecticut Application August 20, 1954, Serial No. 451,151

1 Claim. (Cl. 145—50)

This invention relates to screw driver blades and tips therefor and to the method of making the same.

Heretofore, in making blades for screw drivers for use in connection with recessed head screws, it has been the practice to form the tips thereof from strips of tool steel of rectangular cross-section and to grind the screw-engaging end with the required taper in order to provide them with the required accuracy to enable them to fit into the sockets of the screw heads. The tips were then inserted into accurately drilled bores in the shank of the blade. This has been a costly operation inasmuch as the ground surfaces had to be accurately formed and the bore in the shank to receive the tip had to be accurately drilled in depth in order to properly receive the tip.

The present invention overcomes these difficulties by providing a tool blade in which the tip is formed in an expeditious and less expensive manner and in which the tip is provided with means for limiting its insertion into the shank of the blade.

This is accomplished by providing a tip formed with a truncated, rectangular pyramid at one end and with a stop collar at the base thereof by a heading operation and thereafter hardening the tip and inserting it into a bore in the shank with the stop collar limiting the insertion so that the tip is always properly located at the end of the shank.

A feature of the invention resides in the fact that the formation of the tip by a heading operation prior to the hardening thereof provides an accurate yet inexpensive tip and method of making the same.

Other features and advantages of the invention will be apparent from the specification and claim when considered in connection with the drawings in which:

Figure 1 shows a screw driver with the bit and tip in position.

Fig. 2 is a view of the tip.

Fig. 3 is a bottom end view of the tip.

Fig. 4 is a detailed end of the shank, partly in section, showing the tip in position therein.

Fig. 5 shows a blank for the tip.

Fig. 6 shows the first step in heading the tip.

Fig. 7 shows the tip after the final heading operation.

As shown in the drawing, the screw driver comprises a handle 10 having a blade 11 therein provided with a tip member 12 in a bore 11a drilled or otherwise formed in the end thereof. The tip member 12 has at one end a truncated, rectangular, pyramidal driving portion 13 having four driving surfaces 14 adapted to be inserted into a socket in a screw head. While the inclination of the surfaces 14 may vary as required, it is at present preferred to form them with a 4° slope. At the base of the pyramidal section is an integral stop collar 15 projecting laterally therefrom. The other end of the tip member has its surface 16 knurled so that as it is driven into the bore 11a formed in the end of the relatively soft shank of the blade it will bite therein and be firmly fixed in position.

A feature of the present invention resides in the fact that the bore need not be accurately drilled as to depth since the stop collar 15 engaging the end of the shank will properly locate the tip member in position.

Another feature of the present invention resides in the formation of the tip member from continuous stock by a heading operation whereby inexpensive yet accurate tips can be provided at a high rate of production. I have discovered, contrary to general belief, that it is possible in a heading operation to secure the accurate formation of the pyramidal tip which will enable it to be used with corresponding sockets in screw heads. To accomplish this, a blank 17, such as shown in Fig. 5, is cut from an elongate or continuous supply of rod or wire stock. The blank is then subjected to a first heading operation which roughly shapes it, as shown in Fig. 6. It is then finally subjected to a second heading operation which causes the metal to flow and fill in and preferably form rounded edges 14a of the pyramid so that accurate driving means are formed thereon which will not ream out the recesses in the head of the screw.

After the tip has been completed, as shown in Fig. 7, the surface 16a of the inner end is knurled or suitably roughened, as shown in Fig. 2, and it is ready for assembly with the shank.

It will be apparent, therefore, from the foregoing that I have devised an entirely new blade and tip combination and a novel tip and method of making the same which greatly reduces the cost of the blade over the manner heretofore manufactured and yet maintains a high degree of accuracy in the driving element whereby it can efficiently operate with suitably recessed screw heads to drive the screws thereby.

Variations and modifications may be made within the scope of the claim and portions of the improvements may be used without others.

I claim:

A screw driver having a blade comprising a shank provided with an axial cylindrical bore and a tip mounted therein, said tip consisting of a headed member having a plurality of faces at one end thereof forming a truncated, rectangular pyramid projecting outwardly of said shank and adapted to be inserted into a correspondingly shaped recess in a screw head to drive the same, the adjacent edge portions of said faces being rounded to form accurate driving means which prevents reaming of a recess in a head of a screw; a cylindrical mounting portion on the tip having a knurled surface disposed in said axial bore with a forced fit to secure the tip thereto against rotation with respect to said shank; and a stop collar intermediate the ends of the tip and projecting radially from the base of the pyramid and adjacent the end of said mounting portion, said collar being adapted to engage the end of the shank to limit the insertion of the tip into the shank.

References Cited in the file of this patent

UNITED STATES PATENTS

| | | |
|---|---|---|
| 52,631 | Weaver | Feb. 13, 1866 |
| 1,787,087 | Robertson | Dec. 30, 1930 |
| 1,952,395 | Tillyer et al. | Mar. 27, 1934 |
| 2,218,631 | West et al. | Oct. 22, 1940 |
| 2,442,717 | Willette | June 1, 1948 |
| 2,522,217 | Fischer et al. | Sept. 12, 1950 |
| 2,565,948 | Cambern | Aug. 28, 1951 |

FOREIGN PATENTS

| | | |
|---|---|---|
| 113,786 | Switzerland | Feb. 1, 1926 |

UNITED STATES PATENT OFFICE

CERTIFICATE OF CORRECTION

Patent No. 2,804,894                                          September 3, 1957

William F. Rosenburg

It is hereby certified that error appears in the printed specification of the above numbered patent requiring correction and that the said Letters Patent should read as corrected below.

Column 2, after line 66, list of references cited, under the heading "UNITED STATES PATENTS", add the following:

2,105,119    Hinaes -------- Jan. 11, 1938

Signed and sealed this 29th day of October 1957.

(SEAL)
Attest:

KARL H. AXLINE                                    ROBERT C. WATSON
Attesting Officer                                 Commissioner of Patents